UNITED STATES PATENT OFFICE.

WALDEMAR MERCKENS, OF MÜLHAUSEN, GERMANY, AND JOHN HENRY SMITH, OF ZURICH, SWITZERLAND.

PROCESS FOR PRODUCTION OF COLORED PHOTOGRAPHS.

No. 885,066.  Specification of Letters Patent.  Patented April 21, 1908.

Application filed March 23, 1907. Serial No. 364,118.

*To all whom it may concern:*

Be it known that we, WALDEMAR MERCKENS, a subject of Germany, residing at Mülhausen, Alsace, Germany, (whose post-office address is No. 1 Schwarzwaldplatz, Mülhausen,) and JOHN HENRY SMITH, a subject of the King of Great Britain, residing in Zurich, in the canton of Zurich, Republic of Switzerland, (whose post-office address is No. 417 Seestrasse, Zurich,) have invented certain new and useful Improvements in the Process for the Production of Colored Photographs; and we do hereby declare the following to be a full, clear, and exact description of the invention, such as will enable others skilled in the art to which it appertains to make and use the same.

We have applied for patent in Germany on April 6th 1906, Application M. 29547 VI/57$^b$.

In the course of our experiments for the production of bleaching-out papers (see German Patent Application S. 22257 VI/57$^b$) we have shown that acid dyes embedded in collodion possess the tendency to wander into gelatin while basic dyes embedded in gelatin will wander into collodion if the opportunity is given.

The present invention is based upon this property of the basic dyes to wander out of a layer of moist gelatin or analogous substance for which these dyes have little affinity into a layer of nitrocellulose or analogous cellulose derivative possessing a strong affinity for the basic dyes.

The simplest method of applying this invention is to copy a photographic negative upon a sensitive bichromate of gelatin film, and after developing the film with hot water placing it in a solution of a basic dye. After the gelatin relief has imbibed a sufficient amount of the dye, the superfluous dye is washed off under the tap and the surface dried with blotting paper. The colored gelatin relief is then squeegeed into contact with the collodion surface intended to receive the finished print, and when sufficient dye has wandered into the collodion (which may be seen by raising the corner of the paper) the surfaces are separated. Under ordinary conditions a few minutes are sufficient for the transference of the picture.

The gelatin relief may be employed over and over again, and if three bichromate positives are made from a set of three-color negatives and transferred in their corresponding colors and in register upon the same celluloid surface a three-color print in natural colors will be obtained similar to the pinatype process, but with much saving of time.

What we claim is:—

1. Process for the production of colored prints upon a base consisting of a cellulose derivative of acid character, in which imbibed basic dye solutions are transferred from a temporary picture support having less affinity for the dye.

2. Process for the production of colored prints upon a base consisting of collodion, in which imbibed basic dye solutions are transferred from a temporary picture support having less affinity for the dye.

3. Process for the production of colored prints upon a base consisting of a cellulose derivative of acid character, in which imbibed basic solutions are transferred from a temporary moist gelatin relief picture support.

In testimony whereof, we have signed our names to this specification in the presence of two subscribing witnesses.

WALDEMAR MERCKENS.
JOHN HENRY SMITH.

Witnesses:
 HERMANN KIRCHHOFER,
 JOSEPH SIMON.